(12) United States Patent
Dukes et al.

(10) Patent No.: US 7,621,233 B2
(45) Date of Patent: Nov. 24, 2009

(54) DEVICE FOR DETECTING, CONTAINING, AND INDICATING THE PRESENCE OF FLUIDIC ANIMAL WASTE PRODUCT AT A DEFINED LOCATION

(75) Inventors: Ricky L. Dukes, Knoxville, TN (US); Albert Leon Lee, IV, Seymour, TN (US)

(73) Assignee: Radio Systems Corporation, Knoxville, TN (US)

( * ) Notice: Subject to any disclaimer, the term of this patent is extended or adjusted under 35 U.S.C. 154(b) by 219 days.

(21) Appl. No.: 11/676,433

(22) Filed: Feb. 19, 2007

(65) Prior Publication Data

US 2008/0196671 A1 Aug. 21, 2008

(51) Int. Cl.
*A01K 29/00* (2006.01)
(52) U.S. Cl. ..................... 119/165; 119/712
(58) Field of Classification Search ......... 119/161–173, 119/509, 525–530, 447, 462, 463, 471, 479, 119/480, 712; D30/161; 206/204
See application file for complete search history.

(56) References Cited

U.S. PATENT DOCUMENTS

| | | | | | |
|---|---|---|---|---|---|
| 229,436 | A | * | 6/1880 | Mallett | 4/459 |
| 3,864,676 | A | * | 2/1975 | Macias et al. | 600/382 |
| 4,649,578 | A | * | 3/1987 | Vargo | 119/161 |
| 4,970,122 | A | * | 11/1990 | Palanisamy | 428/432 |
| 5,148,771 | A | * | 9/1992 | Schuett et al. | 119/479 |
| 5,293,837 | A | * | 3/1994 | Caldwell | 119/166 |
| D351,694 | S | * | 10/1994 | Evans | D30/161 |
| 5,367,984 | A | * | 11/1994 | Purnell | 119/166 |
| 5,515,812 | A | * | 5/1996 | Faust | 119/166 |
| D435,149 | S | * | 12/2000 | Kleinberg | D30/161 |
| 6,578,520 | B2 | * | 6/2003 | Otsuji et al. | 119/165 |
| 6,860,239 | B1 | * | 3/2005 | Begun | 119/712 |
| 6,938,579 | B2 | | 9/2005 | Sharpe | |
| 7,096,823 | B1 | * | 8/2006 | Smeltzer | 119/166 |
| 7,107,933 | B2 | * | 9/2006 | Mohr | 119/166 |
| 2003/0217700 | A1 | | 11/2003 | Northrop et al. | |
| 2005/0172908 | A1 | * | 8/2005 | Belgiorno et al. | 119/166 |
| 2005/0224005 | A1 | | 10/2005 | Kim | |
| 2005/0284392 | A1 | * | 12/2005 | Hillman | 119/169 |
| 2006/0011144 | A1 | | 1/2006 | Kates | |
| 2006/0011145 | A1 | | 1/2006 | Kates | |
| 2006/0011146 | A1 | * | 1/2006 | Kates | 119/719 |
| 2008/0035069 | A1 | * | 2/2008 | Yamamoto et al. | 119/169 |
| 2008/0072834 | A1 | * | 3/2008 | Makem | 119/169 |

* cited by examiner

*Primary Examiner*—Kimberly S Smith
(74) *Attorney, Agent, or Firm*—Pitts & Brittian, P.C.

(57) ABSTRACT

Described is an animal waste product notification device for detecting the occurrence of an animal excreting animal waste product at a defined location, containing the waste product such that the animal cannot track the waste product from the defined location, and notifying a local or remote individual of the occurrence. The animal waste product notification device includes a grate, a bin, and a notification device. The grate includes a detector that is responsive to fluidic animal waste product such that when the waste product passes through apertures defined by the grate, the detector generates a detection signal. When the detector generates the detection signal, the notification device notifies a user of the animal waste product notification device. The bin defines a receptacle that receives the waste product after it passes through the grate.

18 Claims, 3 Drawing Sheets

DEVICE FOR DETECTING, CONTAINING, AND INDICATING THE PRESENCE OF FLUIDIC ANIMAL WASTE PRODUCT AT A DEFINED LOCATION

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to a device for indicating that an animal excreted fluidic waste product at a defined location. More particularly, this invention pertains to a device for detecting the occurrence of the animal excreting fluidic waste product at the defined location, for containing the fluidic waste product such that the animal does not track the fluidic waste product from the defined location, and for notifying a local or remote user of said animal waste product notification device of the occurrence.

2. Description of the Related Art

Many pet owners keep indoor pets. And just like an outdoor pet, an indoor pet must relieve itself of fluidic pet waste product before or when it reaches the point of incontinence. While some indoor pets have the opportunity to relieve themselves outdoors, such as by way of a pet door or an escort by a pet owner, certain circumstances, such as weather, absence of the pet owner, a pet's medical condition, or pet owner preference, require that an indoor pet relieve itself indoors. Conventional art has addressed these circumstances with several devices and approaches including strategically positioned newspapers, various litter boxes, floor protection pads, and grate/tray devices. Using newspapers to contain fluidic pet waste product is accomplished by placing several layers of newspaper on the floor of the indoor area and training or forcing, by lining the entire floor of the indoor area, the pet to relieve itself on the newspapers. Using newspapers is limited in that the fluidic waste product soaks through the newspapers, contacting the underlying flooring and potentially staining or damaging the flooring. Additionally, after a pet relieves itself on the newspapers, the pet inevitably steps, sits, or rolls in the fluidic waste product and tracks the waste product throughout the indoor area, generating an unsanitary environment within the indoor area.

Another conventional approach for addressing an indoor pet relieving itself of fluidic waste product within an indoor area is the implementation of a litter box. A litter box typically includes a box-type structure that is partially filled with litter, which is designed to absorb and deodorize fluidic pet waste product. Pets are trained to relieve themselves in the litter box such that the fluidic waste product is absorbed by the litter and contained within the litter box. A conventional litter box is limited in that the litter within a litter box is tracked from the litter box when the animal scratches the litter or simply exits the litter box. When the litter is tracked from the litter box it is inevitably tracked throughout the indoor area. Because the litter absorbs fluidic pet waste product, when the litter is tracked throughout the indoor area, pet waste is also tracked throughout the indoor area, generating an unsanitary environment within the indoor area.

Another conventional device designed to address the abovementioned issues includes the floor protection pad. Similar to the newspapers, a floor protection pad is placed on the floor and the pet is trained or forced to relieve itself of fluidic pet waste product on the floor protection pad. The floor protection pad absorbs and deodorizes the fluidic pet waste product. However, floor protection pads are limited in that, as with the newspapers and the litter box, the pet inevitably steps, sits, or rolls in the fluidic pet waste product and tracks the pet waste product throughout the indoor area, generating an unsanitary environment within the indoor area.

Another conventional device designed to contain fluidic pet waste product is the grate/tray device. Conventional grate/tray devices generally include a receptacle tray disposed below a grate that is accessible by the pet. The pet is trained to relieve itself on the grate of the device. When the pet excretes fluidic waste product on the grate, the fluidic waste product drains through the grate and to the tray such that the waste product is collected by the tray. Because the waste product is collected by the tray, the pet cannot step, sit, or roll in the waste product and track it throughout the indoor area. However, a conventional grate/tray device, like the other conventional devices, is limited in that when the waste product is contained by the conventional device, the pet caretaker is not notified that the conventional device contains the waste product. And when the waste product remains contained by the conventional device without being attended to by the caretaker, the waste product becomes an unsanitary cesspool that presents potentially detrimental health consequences to the pet and the caretaker and generates an unsavory odor that fills the indoor area. As a result of the state of the conventional art, a device for detecting when an animal excretes fluidic waste product at a defined location, for containing the fluidic waste product such that the animal cannot track the waste product from the defined location, and for indicating that the animal excreted fluidic waste product at the defined location to a local or remote individual is desired.

BRIEF SUMMARY OF THE INVENTION

In accordance with the various features of the present invention there is provided an animal waste product notification device for detecting the occurrence of an animal excreting fluidic waste product at a defined location, containing the fluidic waste product such that the animal does not track the waste product from the defined location, and notifying a local or remote user of the animal waste product notification device of the occurrence. The animal waste product notification device includes a grate, a bin, and a notification device. The grate is structured such that fluidic waste product passes through apertures defined by the grate. The grate is disposed relative to the bin, which defines a receptacle adapted to retain fluid, such that fluidic waste product that passes through the apertures defined by the grate is retained by the bin. The grate includes a detector that is responsive to fluidic waste product such that when the fluidic waste product passes through the apertures defined by the grate, the detector generates an electrical detection signal. The detector of the grate is in electrical communication with the notification device such that the notification device is responsive to the detection signal generated by the detector. More specifically, when the detector generates the detection signal, the notification device notifies the user of the animal waste product notification device, such as the animal's caretaker. In other words, when fluidic waste product passes through the apertures defined by the grate, the user of the animal waste product notification device is notified of the occurrence.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

From the outset, it should be noted that the present invention may be embodied in many different forms and should not be construed as limited to the specific embodiments described herein. Rather, the embodiments described herein are provided to ensure that this detailed description is thorough and complete, and to ensure that the scope and spirit of the present invention are communicated effectively to those skilled in the art. Accordingly, one embodiment of an animal waste product notification device for detecting the occurrence of an animal excreting fluidic waste product at a defined location, containing the fluidic waste product such that the animal does not track the waste product from the defined location, and notifying a local or remote user of the animal waste product notification device of the occurrence and constructed in accordance with the various features of the present invention is illustrated generally at 10 in FIG. 1. The animal waste product notification device 10 includes a grate, a bin, and a notification device. The grate is structured such that fluidic waste product passes through apertures defined by the grate. The grate is disposed relative to the bin, which defines a receptacle adapted to retain fluid, such that fluidic waste product that passes through the apertures defined by the grate is retained by the bin. The grate includes a detector that is responsive to fluidic waste product such that when the fluidic waste product passes through the apertures defined by the grate, the detector generates an electrical detection signal. The detector of the grate is in electrical communication with the notification device such that the notification device is responsive to the detection signal generated by the detector. More specifically, when the detector generates the detection signal, the notification device notifies the user of the animal waste product notification device 10, such as the animal's caretaker. In other words, when fluidic waste product passes through the apertures defined by the grate, the user of the animal waste product notification device 10 is notified of the occurrence.

Figure 1:
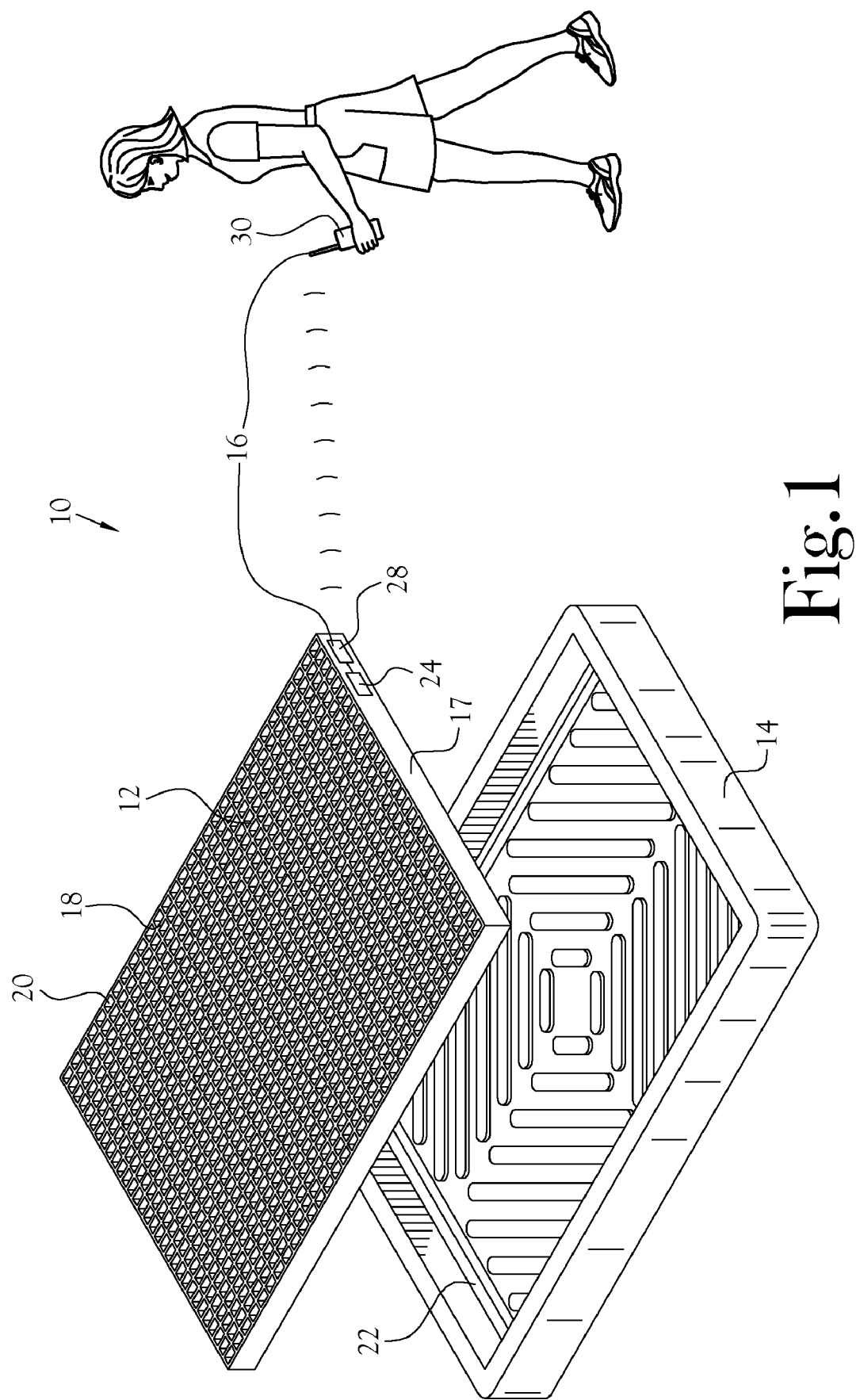
FIG. 1 illustrates the animal waste product notification device in accordance with the various features of the present invention.

FIG. 1 illustrates one embodiment of the animal waste product notification device 10 in accordance with the various features of the present invention. The animal waste product notification device 10 includes a grate 12, a bin 14, and a notification device 16. In the illustrated embodiment, the grate 12 includes a perimeter member 17 and a framework of structure members 18 that define a plurality of apertures 20 within the perimeter member 17. Additionally, the framework of structure members 18 defines a platform that structurally supports and is accessible by the animal. Consequently, the structure members 18 of the grate 12 are substantial to the extent that the structure members 18 structurally support the weight of the animal. Additionally, the plurality of apertures 20 defined by the structure members 18 are such that fluidic waste product passes through the plurality of apertures 20 to the extent that the fluidic waste product passes through the grate 12. In the illustrated embodiment the structure members 18 include a first set of parallel structure members 18 that mechanically engage the perimeter member 17 and perpendicularly intersect with a second set of parallel structure members 18 that mechanically engage the perimeter member 17 such that the structure members 18 define a plurality of square apertures 20 within the perimeter member 17. It should be noted that the structure members 18 can be arranged in a manner that is different from the arrangement of the illustrated embodiment, such as in a solely parallel or a latticed manner, without departing from the scope or spirit of the present invention. It should also be noted that the grate 12 can define the plurality of apertures 20 and structurally support the weight of the animal by ways other than the structure members 18 without departing from the scope or spirit of the present invention.

The bin 14 defines a receptacle that retains fluid, such as the fluidic waste product excreted by the animal. The bin 14 is disposed relative to the grate 12 such that the fluidic waste product that passes through the grate 12 is received and retained by the bin 14. In the illustrated embodiment, the bin 14 includes a shoulder 22 at the rim of the receptacle defined by the bin 14. The perimeter member 17 of the grate 12 rests on the shoulder 22 such that the structure members 18 of the grate 12 are disposed above the receptacle defined by the bin 14. Consequently, the plurality of apertures 20 are aligned with the receptacle to the extent that when the fluidic waste product passes through the grate 12, the fluidic waste product is received and retained by the bin 14. It should be noted that configurations and respective embodiments of the grate 12 and the bin 14 other than the illustrated configuration and respective embodiments can be used without departing from the scope or spirit of the present invention. For example, the grate 12 may include support structures, such as legs, that situate the grate 12 above the bin 14 as described above such that the grate 12 is not structurally supported by the bin 14.

Figure 2:
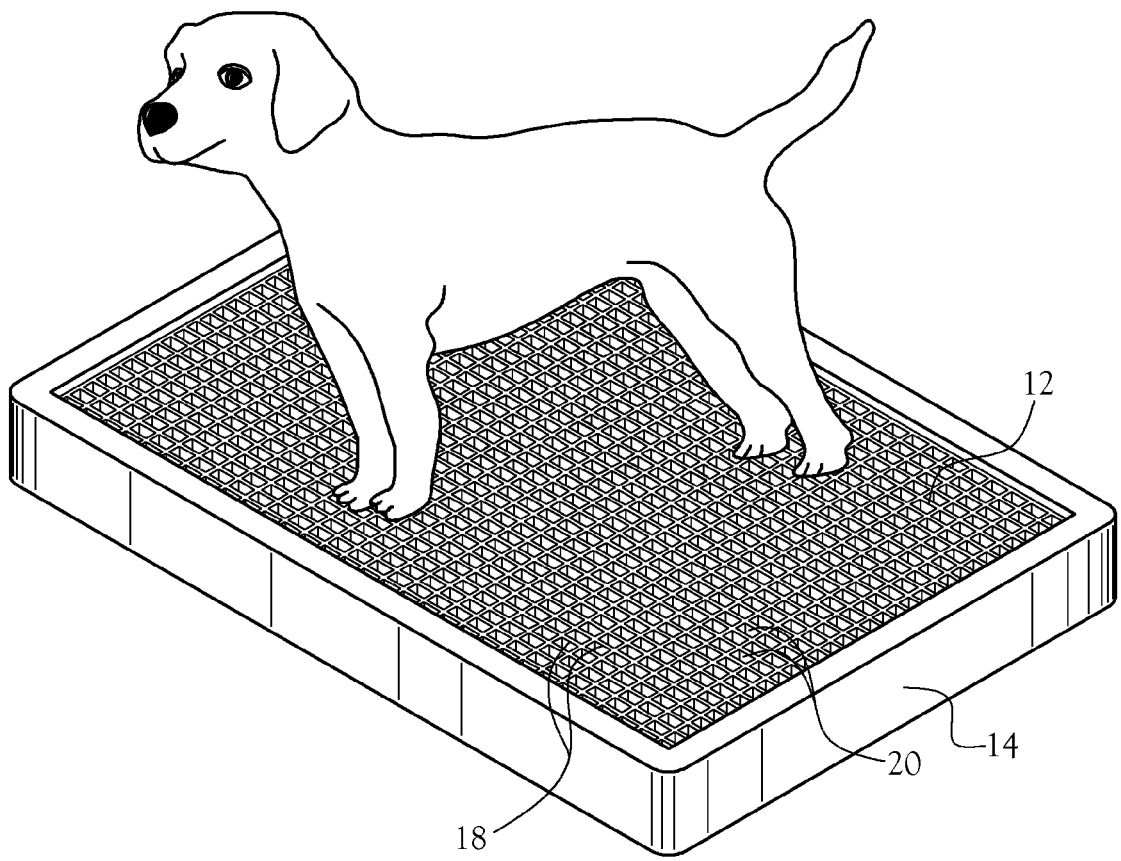
FIG. 2 illustrates an animal accessing the animal waste product notification device depicted in FIG. 1.

FIG. 2 illustrates the animal waste product notification device 10 of FIG. 1 being accessed by the animal. When it is time for the animal to relieve itself of fluidic waste product, the animal accesses the animal waste product notification device 10. In other words, the animal positions itself on the platform defined by the structure members 18 of the grate 12. As the animal stands on the grate 12, it excretes fluidic waste product. The fluidic waste product passes through the grate 12 to the bin 14, where the fluidic waste product is retained. Because the waste product passes through the grate 12 and is retained at the bin 14, the animal's tracking of the waste product from the animal waste product notification device 10 is minimized, thus promoting a more sanitary surrounding environment.

Figure 3:
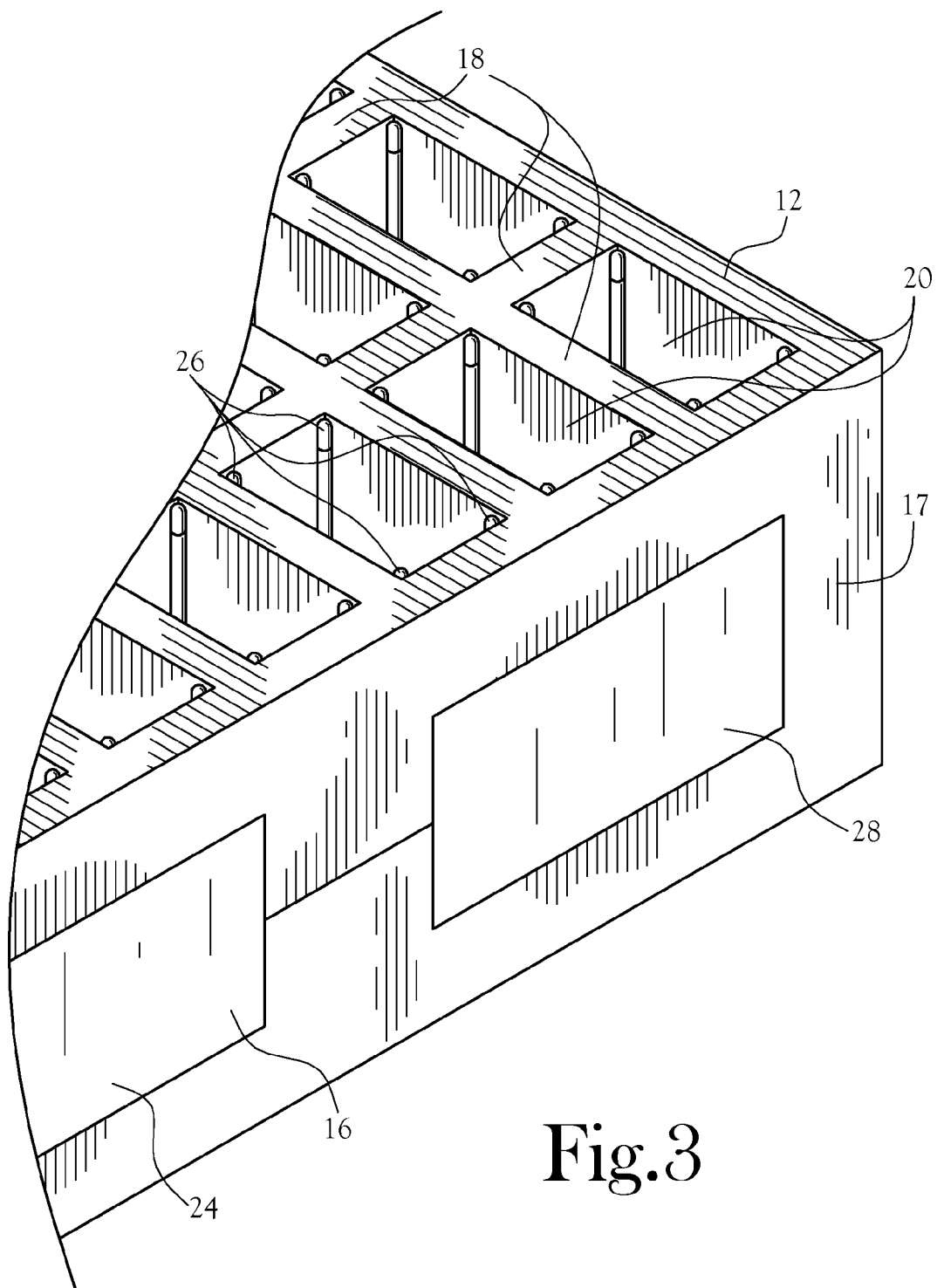
FIG. 3 illustrates the detector of the grate of the animal waste product notification device in accordance with the various features of the present invention.

The grate 12 includes a detector 24, represented at FIG. 1 and illustrated at FIG. 3. The detector 24 is responsive to the fluidic waste product such that when the fluidic waste product passes through any aperture of the plurality of apertures 20 defined by the structure members 18 of the grate 12, the detector 24 generates an electrical detection signal. More specifically, FIG. 3 illustrates one embodiment of the detector 24. In the illustrated embodiment, the detector 24 includes a plurality of electrodes 26 disposed at each aperture of the plurality of apertures 20. More specifically, in the illustrated embodiment, an electrode of the plurality of electrodes 26 is disposed in each corner defined by each aperture of the plurality of apertures 20. The plurality of electrodes 26 defines an open circuit. As previously discussed, when the fluidic waste product passes through the grate 12, the fluidic waste product passes through the plurality of apertures 20 defined by the structure members 18. When the fluidic waste product passes through the plurality of apertures 20, the fluidic waste product engages various electrodes of the plurality of electrodes 26, completing the otherwise open circuit. Completing the otherwise open circuit induces the detector 24 to generate the detection signal. It should be noted that a detector 24 other than the detector 24 of the illustrated embodiment can be used without departing from the scope or spirit of the present invention.

The detector 24 is in electrical communication with the notification device 16, as depicted in FIG. 1. The notification device 16 is responsive to the detection signal generated by the detector 24 such that when the detector 24 generates the detection signal, the notification device 16 delivers a notification to the user of the animal waste product notification device 10, such as a caretaker of the animal. In the illustrated embodiment, the notification device 16 includes a transmitter 28 and a receiver 30. The transmitter 28 is in electrical communication with the detector 24 and in wireless communication with the receiver 30. When the detector 24 generates the detection signal, the transmitter 28 communicates a notification signal to the receiver 30. When the receiver 30 receives the notification signal from the transmitter 28, the receiver 30 delivers a notification to the user. In the illustrated embodiment, the receiver 30 is adapted to be carried by the user such that the receiver 30 is proximate to the user at all times. Additionally, in one embodiment, the notification delivered by the receiver 30 is an audible tone, such as a beep. It should be noted that the notification device 16 can include components other than the transmitter 28 and the receiver 30 without departing from the scope or spirit of the present invention. For example, one embodiment of the notification device 16 includes an alarm in electrical communication with the detector 24 such that when the detector 24 generates the detection signal, the alarm delivers an audible tone to the user. Additionally, it should be noted that notifications other than an audible tone, such as a vibration, can be delivered by the notification device 16 without departing from the scope or spirit of the present invention. It should also be noted that the receiver 30, if employed, can be a device other than a device carried by the user without departing from the scope or spirit of the present invention.

Considering the above discussion and the illustrated embodiment of the animal waste product notification device 10, when the animal accesses the animal waste product notification device 10 and excretes fluidic waste product, the fluidic waste product passes through the grate 12 to the bin 14. As the fluidic waste product passes through the grate 12, the detector 24 detects the occurrence. When the detector 24 detects that the fluidic waste product is passing through the grate 12, the detector 24 generates the detection signal, which induces the transmitter 28 to transmit the notification signal to the receiver 30. When the receiver 30 receives the notification signal, the receiver 30 generates an audible tone, notifying the user that the animal has excreted fluidic waste product that is currently retained at the bin 14. Because the user is notified of this occurrence, the user can immediately, or as soon as possible, empty the waste product from the bin 14 and otherwise clean and sanitize the bin 14. Because the user is able to promptly respond to the occurrence of the animal excreting fluidic waste product, the waste product does not become unsanitary and present potentially detrimental health consequences to the animal and the user. Additionally, because the user is able to respond promptly, the waste product does not generate an unsavory odor that fills the surrounding area.

From the foregoing description, those skilled in the art will recognize that a device for notifying a user when an animal excretes fluidic waste product offering advantages over the prior art has been provided. The device provides a detector for detecting fluidic waste product that is excreted by an animal at a defined area. Further, the device provides a notification device that notifies the user when the detector detects the fluidic waste product.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, what is claimed is:

1. An animal waste product notification device for detecting the occurrence of an animal excreting fluidic waste product at a defined location, for containing the fluidic waste product, and for notifying a user of said animal waste product notification device of the occurrence, said animal waste product notification device comprising:
   a grate defining a plurality of apertures such that the fluidic waste product passes through at least one aperture of the plurality of apertures, said grate providing a platform for the animal;
   a detector responsive to the fluidic waste product that passes through the at least one aperture of the plurality of apertures to the extent that said detector generates a detection signal when the fluidic waste product passes through the at least one aperture of the plurality of apertures;
   a bin defining a receptacle capable of retaining the fluidic waste product, said bin disposed relative to said grate such that the fluidic waste product that passes through the at least one aperture of the plurality of apertures is retained by said bin; and
   a notification device in communication with said detector, said notification device delivers a notification to the user when said detector generates the detection signal.

2. The animal waste product notification device of claim 1 wherein said detector is mechanically engaged with said grate.

3. The animal waste product notification device of claim 1 wherein said detector includes a plurality of electrodes partially defining an open circuit that is completed by the fluidic waste product that passes through the at least one aperture of the plurality of apertures.

4. The animal waste product notification device of claim 1 wherein said detector is disposed within apertures of the plurality of apertures defined by said grate.

5. The animal waste product notification device of claim 1 wherein said bin is disposed below said grate such that the receptacle defined by said bin is aligned under the plurality of apertures defined by said grate.

6. The animal waste product notification device of claim 1 wherein said bin is coupled to said grate.

7. The animal waste product notification device of claim 1 wherein said bin structurally supports said grate.

8. The animal waste product notification device of claim 1 wherein said notification device delivers an audible notification to the user.

9. The animal waste product notification device of claim 1 wherein said notification device delivers a visual notification to the user.

10. The animal waste product notification device of claim 1 wherein said notification device includes a transmitter and a receiver, the transmitter in electrical communication with said detector and in wireless communication with the receiver, the transmitter induces the receiver to deliver the notification to the user when said detector detects the fluidic waste product that passes through the at least one aperture of the plurality of apertures.

11. The animal waste product notification device of claim 10 wherein the receiver is adapted to be carried by the user.

12. The animal waste product notification device of claim 10 wherein the receiver delivers an audible notification to the user.

13. The animal waste product notification device of claim 10 wherein the receiver delivers a vibration notification to the user.

14. The animal waste product notification device of claim 10 wherein the receiver delivers a visual notification to the user.

15. An animal waste product notification device for detecting the occurrence of an animal excreting fluidic waste product at a defined location, for containing the fluidic waste product, and for notifying a user of said animal waste product notification device of the occurrence, said animal waste product notification device comprising:
- a grate providing a platform for the animal when excreting the fluidic waste product, said grate defining at least one aperture, whereby the fluidic waste product passes through the at least one aperture defined by said grate, said grate detects the fluidic waste product passing through the at least one aperture defined by said grate;
- a bin disposed relative to said grate such that the fluidic waste product that passes through the at least one aperture defined by said grate is received and retained by said bin; and
- a notification device in communication with said grate, said notification device delivers a notification to the user when said grate detects the fluidic waste product pass through the at least one aperture defined by said grate.

16. The animal waste product notification device of claim 15 wherein said grate detects the fluidic waste product passing through the at least one aperture defined by said grate by way of a plurality of electrodes, whereby the fluidic waste product completes an otherwise open circuit that includes the plurality of electrodes when the fluidic waste product engages the plurality of electrodes.

17. The animal waste product notification device of claim 15 wherein said notification device includes a transmitter and a receiver, the transmitter in communication with said grate, the transmitter communicates with the receiver when said grate detects the fluidic waste product pass through the at least one aperture defined by said grate, the receiver delivers a notification to the user when the transmitter communicates with the receiver.

18. An animal waste product notification device for detecting the occurrence of an animal excreting fluidic waste product at a defined location, for containing the fluidic waste product, and for notifying a user of said animal waste product notification device of the occurrence, said animal waste product notification device comprising:
- a grate defining a surface, the surface defining a platform that structurally supports the animal, the fluidic waste product excreted at said grate passes through the surface defined by said grate;
- a detector disposed proximate to said grate, said detector detects the fluidic waste product passing through the surface defined by said grate, said detector generates a detection signal when said detector detects the fluidic waste product passing through the surface defined by said grate;
- a bin including a receptacle that retains the fluidic waste product, said bin disposed relative to said grate such that the receptacle of said bin receives and retains the fluidic waste product that passes through the surface defined by said grate;
- a transmitter in electrical communication with said detector, said transmitter generating a notification signal when said detector generates the detection signal; and
- a receiver in wireless communication with said transmitter, said receiver delivers a notification to the user when said transmitter generates the notification signal.

* * * * *